Patented July 16, 1929.

1,720,895

UNITED STATES PATENT OFFICE

FRAZIER GROFF, OF BLOOMFIELD, NEW JERSEY, AND GEORGE W. MILLER, OF CHICAGO, ILLINOIS, ASSIGNORS TO BAKELITE CORPORATION, OF NEW YORK, N. Y., A CORPORATION OF DELAWARE.

PHENOLIC RESIN AND PROCESS OF MAKING SAME.

No Drawing.    Application filed June 25, 1927. Serial No. 201,559.

This invention relates to a novel resinous composition resulting from the reaction between furfural and a fusible or non-reactive resin of the phenol-methylene type; and to a process for preparing such composition.

In the manufacture of reactive phenolic resins, and the insoluble and infusible (resinoid) reaction products thereof, it is common practice to react a fusible and soluble phenol resin with a methylene-containing hardening agent, as disclosed for example in United States Patent 1,038,475 to L. H. Baekeland. Furfural although an aldehyde, reacts with extreme slowness as compared with formaldehyde or hexamethylenetetramine upon these phenolic resins, or under some conditions not at all; and cannot therefore be substituted for these methylene-containing hardening agents for those industrial uses where a high reaction rate is required, as for example mixtures intended for hot-press molding. We have discovered that under conditions as described below, involving a special treatment or conditioning of the fusible methylene resin by heating it with furfural in presence of a basic condensing agent, preferably lime, it is possible to prepare a fusible and non-reactive or very slowly reactive resin, which, when admixed with a suitable hardening agent, may be used with advantage as a component of industrial molding mixtures.

As an example of the manner in which the process may be carried into effect, 200 pounds of a phenol-methylene resin, which may be made either with phenol (oxybenzyl alcohol), cresol, or a mixture of these, are heated to a liquefying temperature of about 140°–150° C. in a steam jacketed mixing machine provided with internal stirrers or paddles for mixing the charge. To the batch of fluid resin or resins aforesaid is added about six pounds of stearic acid, and sixteen pounds of hydrated lime. The mixture, heated to 130°–150° C., is stirred for 15 to 30 minutes, after which 30 pounds, more or less, of furfural is added. Stirring is continued at about the same temperature for 5 to 30 minutes, or until a sample of the resin is brittle when cold.

Other basic condensing or catalytic agents may replace the hydrated lime wholly or in part, as for example magnesia, or the carbonates or hydroxids of potassium and sodium. These serve to establish the necessary basic conditions for the reaction.

The product prepared as above described is a hard, brittle, readily pulverizable resin. The resin is non-reactive or very slowly reactive, and, for the preparation of commercial molding mixtures is compounded with fibrous or other filling materials, preferably woodflour or asbestos, and with 5–12 percent of hexamethylenetetramine, paraform, or other methylene-containing hardening agent.

The practical application of this process is not confined to the weights or proportions of materials previously specified, as such proportions permit of considerable variation in order to meet, when required, particular characteristics in the finished product. In particular it is often advantageous to incorporate with the phenol-methylene resin, a fusible resin of relatively low reactivity, as for example a cresol-formaldehyde or phenol-acetaldehyde resin; or even a retarding agent or plasticizer, such as rosin or colophony. It is a noteworthy fact that the treatment described strongly accelerates the hardening rate of molding mixtures prepared with the less reactive resins, while less markedly affecting the more advanced resins,—a highly advantageous circumstance, since thereby irregularities in manufacturing operations are overcome and greater uniformity of product obtained.

Another advantage of the described process is that the addition of furfural facilitates the liming operation and makes feasible the liming of those very stiff resins which could not otherwise be handled without special high-powered equipment.

Our invention contemplates broadly the treatment of fusible phenolic resins with a basic condensing agent in presence of furfural, as a step preparatory to the incorporation therewith of the methylene-containing hardening agent. The complete process of making the molding mixture according to this invention may therefore be regarded as consisting of three operating stages, to wit, the preparation of the non-reactive phenol methylene resin; its treatment with a basic condensing agent and furfural (with or without a promoter for the reaction as described below) but without destroying its non-reactive character for commercial purposes; and the incorporation of the resulting resin with a filler and a methylene-containing hardening agent to form the desired reactive molding mixture. The term "non-reactive" as used herein does not of course mean incapable of any reaction under any conditions of time or temperature, but implies inertness or non-reactivity under commercial molding conditions. Suitable lubricants, such as stearic acid, are preferably incorporated during the second of these operating stages.

In the process as described above the methylene-containing hardening agent is incorporated during the third of these operating stages. It is however of advantage in certain cases, and especially with very slowly reactive resins, to incorporate a small proportion of this hardening agent, as hexamethylenetetramine, during the second operating stage. The purpose of this small addition, hereinafter termed a "promoter", is not to harden the resin during that stage, but to advance the resin beyond the initial, highly fusible stage, and thereby to lessen the time required for the final curing or conversion to the resinoid state. In this way rapid-molding mixtures may be prepared from resin compositions which are normally too sluggish in their reaction rate for commercial purposes.

We claim:

1. The hereindescribed fusible non-reactive resinous reaction product of a fusible phenol-methylene resin, a basic condensing agent, and furfural.

2. The hereindescribed fusible non-reactive resinous reaction product of a fusible phenol-methylene resin, furfural, a basic condensing agent, and a methylene-amine promoter.

3. Process of making a fusible non-reactive phenolic resin comprising reacting a fusible phenol-methylene resin with furfural in presence of a basic condensing agent.

4. Process of making a fusible non-reactive phenolic resin comprising reacting a fusible phenol-methylene resin with furfural in presence of a basic condensing agent and a methylene-amine promoter.

5. Process of making a fusible non-reactive phenolic resin comprising reacting a fusible phenol-methylene resin with furfural in presence of lime.

6. Process of making a fusible non-reactive phenolic resin comprising reacting a fusible phenol-methylene resin with furfural in presence of lime and hexamethylenetetramine.

7. Process of making a potentially reactive molding mixture, comprising reacting a fusible phenol-methylene resin with furfural in presence of a basic condensing agent to form a fusible non-reactive resin, and incorporating therewith a methylene-containing hardening agent and a filler to make a reactive molding mixture.

8. Process of making a potentially reactive molding mixture, comprising reacting a fusible phenol-methylene resin with furfural in presence of a basic condensing agent and a methylene-amine promoter to form a fusible resin, and incorporating therewith a methylene-containing hardening agent and a filler to make a reactive molding mixture.

In testimony whereof, we affix our signatures.

FRAZIER GROFF.
GEORGE W. MILLER